US011175151B1

(12) United States Patent
Russo et al.

(10) Patent No.: US 11,175,151 B1
(45) Date of Patent: Nov. 16, 2021

(54) SYSTEMS AND METHODS OF EFFICIENT CARPOOLING BASED ON DRIVER RISK GROUPS

(71) Applicant: BLUEOWL, LLC, San Francisco, CA (US)

(72) Inventors: Micah Wind Russo, Oakland, CA (US); Theobolt N. Leung, San Francisco, CA (US); Gareth Finucane, San Francisco, CA (US); Eric Dahl, Newman Lake, WA (US)

(73) Assignee: BLUEOWL, LLC, San Francisco, CA (US)

( * ) Notice: Subject to any disclaimer, the term of this patent is extended or adjusted under 35 U.S.C. 154(b) by 308 days.

(21) Appl. No.: 16/203,254

(22) Filed: Nov. 28, 2018

(51) Int. Cl.
*G01C 21/34* (2006.01)
*G07C 5/00* (2006.01)
*B60W 40/09* (2012.01)

(52) U.S. Cl.
CPC ......... *G01C 21/3438* (2013.01); *B60W 40/09* (2013.01); *G07C 5/008* (2013.01)

(58) Field of Classification Search
CPC .... G01C 21/3438; B60W 40/09; G07C 5/008

USPC ........................................................ 701/410
See application file for complete search history.

(56) References Cited

U.S. PATENT DOCUMENTS

| 8,818,834 | B1 | 8/2014 | Rastovich et al. |
| 9,892,573 | B1 | 2/2018 | Hsu-Hoffman et al. |
| 9,900,354 | B1 | 2/2018 | Thome et al. |
| 2015/0254581 | A1 | 9/2015 | Brahme |
| 2017/0352125 | A1 | 12/2017 | Dicker et al. |

*Primary Examiner* — Maceeh Anwari
(74) *Attorney, Agent, or Firm* — Faegre Drinker Biddle & Reath LLP

(57) ABSTRACT

Systems and methods of efficient carpooling based on driver risk groups are provided. Vehicle operators may be classified into a carpooling group based on vehicle routes associated with each of the vehicle operators. Vehicle sensor data associated with each vehicle operator of the carpooling group may be analyzed. Based on the analysis of the vehicle sensor data, one or more indicia of safe driving behaviors associated with each vehicle operator of the carpooling group may be identified. The safe driving behaviors associated with each vehicle operator of the carpooling group may be compared. Based on the comparison, a vehicle operator of the carpooling group may be selected as a driver for a carpool. For example, the safest vehicle operator of the carpooling group may be selected as the driver for the carpool. The carpool may include one or more of the other vehicle operators of the carpooling group as passengers.

20 Claims, 4 Drawing Sheets

SYSTEMS AND METHODS OF EFFICIENT CARPOOLING BASED ON DRIVER RISK GROUPS

FIELD OF THE DISCLOSURE

The present disclosure generally relates to vehicle safety and, more particularly, to efficient carpooling based on driver risk groups.

BACKGROUND

Individuals often commute in carpools for various reasons, such as, e.g., to save money on fuel, to be environmentally friendly by reducing the number of total vehicles on the road, etc. Carpools are typically formed between a few individuals in an ad-hoc manner. However, individuals who form ad-hoc carpool groups typically do not take factors such as safety or efficiency into account.

SUMMARY

In one aspect, a computer-implemented method of efficient carpooling based on driver risk groups is provided. The method comprises: classifying, by a processor, a plurality of vehicle operators into a carpooling group based on vehicle routes associated with each of the vehicle operators; analyzing, by a processor, vehicle sensor data associated with each vehicle operator of the carpooling group; identifying, by a processor, based on the analysis of the vehicle sensor data, one or more indicia of safe driving behaviors associated with each vehicle operator of the carpooling group; comparing, by a processor, the safe driving behaviors associated with each vehicle operator of the carpooling group; and selecting, by a processor, based on the comparison, a vehicle operator of the carpooling group as a driver for a carpool, the carpool including one or more of the other vehicle operators of the carpool group as passengers.

In another aspect, a computer system for efficient carpooling based on driver risk groups is provided. The computer system comprises one or more processors and one or more memories storing instructions. The instructions, when executed by the one or more processors, cause the computer system to: classify a plurality of vehicle operators into a carpooling group based on vehicle routes associated with each of the vehicle operators; analyze vehicle sensor data associated with each of the plurality of vehicle operators of the carpooling group; identify, based on the analysis of the vehicle sensor data, one or more indicia of safe driving behaviors associated with each vehicle operator of the carpooling group; compare the safe driving behaviors associated with each vehicle operator of the carpooling group; and select, based on the comparison, a vehicle operator of the carpooling group as a driver for a carpool, the carpool including one or more of the other vehicle operators of the carpool group as passengers.

In still another aspect, a computer-readable storage medium having stored thereon a set of instructions for efficient carpooling based on driver risk groups is provided. The instructions are executable by a processor, and comprise instructions for: classifying a plurality of vehicle operators into a carpooling group based on vehicle routes associated with each of the vehicle operators; analyzing vehicle sensor data associated with each of the plurality of vehicle operators of the carpooling group; identifying, based on the analysis of the vehicle sensor data, one or more indicia of safe driving behaviors associated with each vehicle operator of the carpooling group; comparing the safe driving behaviors associated with each vehicle operator of the carpooling group; and selecting, based on the comparison, a vehicle operator of the carpooling group as a driver for a carpool, the carpool including one or more of the other vehicle operators of the carpool group as passengers.

DETAILED DESCRIPTION

Individuals often commute in carpools for various reasons, such as, e.g., to save money on fuel, to be environmentally friendly by reducing the number of total vehicles on the road, etc. Carpools are typically formed between a few individuals in an ad-hoc manner. However, individuals who form ad-hoc carpool groups typically do not take factors such as safety or efficiency into account.

Systems and methods of efficient carpooling based on driver risk groups are provided herein. Individuals who frequently go to the same destination at similar times (e.g., employees of the same company, students at the same school, volunteers at the same organization, members of the same church, etc.), or who otherwise frequently drive similar routes, may be sorted into carpooling groups. Individuals may be grouped based on origin (e.g., home) location and/or specific departure/arrival times. For example, individuals who live close to one another and/or who go to and/from the destination at similar times may be grouped together. Within a carpooling group, a driver may be selected based on the individual who is the safest driver, as indicated by vehicle telematics data associated with the individual or by driving safety scores and/or badges earned by the individual. Furthermore, within a carpooling group, a driving vehicle may be selected based on which of the individuals' vehicles is the most safe.

Specifically, vehicle operators may be classified into a carpooling group based on vehicle routes associated with each of the vehicle operators. Vehicle sensor data associated with each vehicle operator of the carpooling group may be analyzed. Based on the analysis of the vehicle sensor data, one or more indicia of safe driving behaviors associated with each vehicle operator of the carpooling group may be identified. The safe driving behaviors associated with each vehicle operator of the carpooling group may be compared. Based on the comparison, a vehicle operator of the carpooling group may be selected as a driver for a carpool. For example, the safest vehicle operator of the carpooling group may be selected as the driver for the carpool. The carpool may include one or more of the other vehicle operators of the carpooling group as passengers.

Figure 1A:
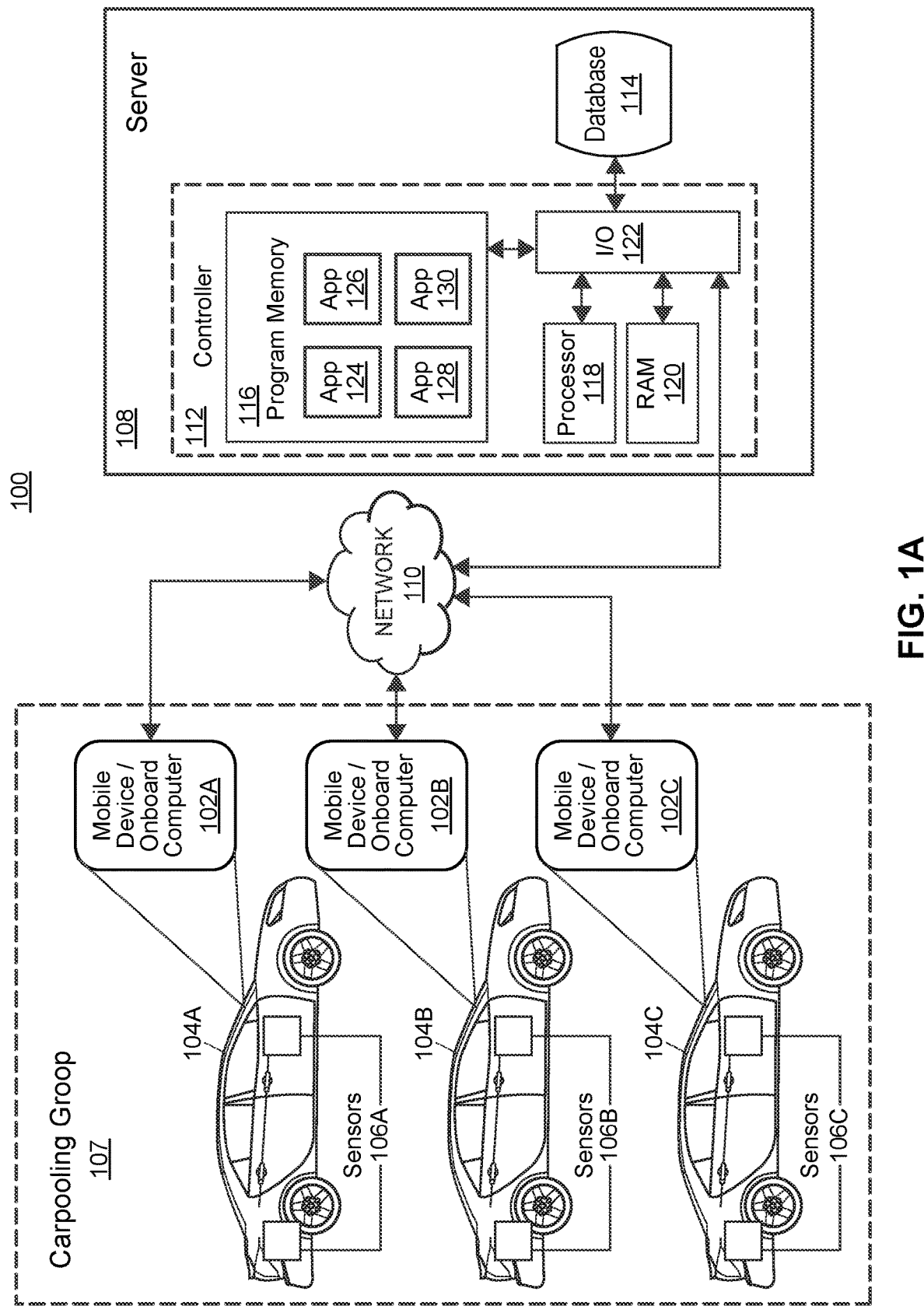
FIG. 1A illustrates an exemplary computer system for efficient carpooling based on driver risk groups, in accordance with some embodiments.

Referring now to FIG. 1A, an exemplary computer system 100 for efficient carpooling based on driver risk groups is illustrated, in accordance with some embodiments. The high-level architecture illustrated in FIG. 1A may include both hardware and software applications, as well as various data communications channels for communicating data between the various hardware and software components, as is described below.

As shown in FIG. 1A, a plurality of mobile devices and/or on-board computers 102A, 102B, 102C (shown in greater detail at FIG. 1B) associated with respective vehicles 104A, 104B, 104C (which may be, e.g., cars, trucks, boats, motorcycles, motorized scooters, or any other vehicles) may interface with respective sensors 106A, 106B, 106C, which may capture vehicle telematics data and other suitable data associated with their respective vehicles 104A, 104B, 104C. The operators of the vehicles 104A, 104B, 104C may be classified into a carpooling group 107 based on vehicle routes associated with each of the vehicle operators. Although only three vehicles 104A, 104B, 104C are shown in the carpooling group 107 in FIG. 1A, there may be any number of vehicles in a carpooling group 107 in various embodiments. Additionally, although only one carpooling group 107 is shown in FIG. 1A, there may be any number of carpooling groups 107 in various embodiments.

The mobile devices and/or on-board computers 102A, 102B, 102C may be configured to communicate the captured sensor data to a server 108 via a network 110. By analyzing this captured sensor data, the server 108 may, for example, determine vehicle routes associated with vehicle operators, classify vehicle operators into carpooling groups 107 based on these vehicle routes, identify indications of safe driving behavior by vehicle operators associated with each carpooling group 107, compare the safe driving behaviors associated with each vehicle operator of a given carpooling group 107, select a vehicle operator of the carpooling group as a driver for a carpool, etc.

As shown in FIG. 1A, the server 108 may include a controller 112 that may be operatively connected to the one or more databases 114 via a link, which may be a local or a remote link. The one or more databases 114 may be adapted to store data related to, for instance, vehicle routes associated with each vehicle operator, vehicle operators classified into each carpooling group, vehicle telematics data trends and/or thresholds indicating safe driving behaviors, various scores and/or categorizations of safe driving behaviors for each vehicle operator, results of comparisons between vehicle operators, listings and/or rankings of safest vehicle operators, listings and/or rankings of safest vehicles, drivers and/or passengers selected for a particular carpool or carpooling group, etc. It should be noted that, while not shown, additional databases may be linked to the controller 112. Additionally, separate databases may be used for various types of information, in some instances, and additional databases (not shown) may be communicatively connected to the server 108 via the network 110.

The controller 112 may include one or more program memories 116, one or more processors 118 (which may be, e.g., microcontrollers and/or microprocessors), one or more random-access memories (RAMs) 120, and an input/output (I/O) circuit 122, all of which may be interconnected via an address/data bus. Although the I/O circuit 122 is shown as a single block, it should be appreciated that the I/O circuit 122 may include a number of different types of I/O circuits. The program memory 116 and RAM 120 may be implemented as semiconductor memories, magnetically readable memories, optically readable memories, or biologically readable memories, for example. Generally speaking, the program memory 116 and/or the RAM 120 may respectively include one or more non-transitory, computer-readable storage media. The controller 112 may also be operatively connected to the network 110 via a link.

The server 108 may further include a number of various software applications 124, 126, 128, 130 stored in the program memory 116. Generally speaking, the applications may perform one or more functions related to, inter alia, classifying vehicle operators into carpooling groups based on vehicle routes associated with each vehicle operator, analyzing vehicle sensor data associated with each vehicle operator of the carpooling group, identifying safe driving behaviors associated with each vehicle operator of the carpooling group, comparing the safe driving behaviors associated with each vehicle operator, selecting a vehicle operator of the carpooling group as a driver for a carpool, etc. For example, one or more of the applications 124, 126, 128, 130 may perform at least a portion of any of the method 300 shown in FIG. 3. The various software applications 124, 126, 128, 130 may be executed on the same processor 126 or on different processors. Although four software applications 124, 126, 128, 130 are shown in FIG. 1A, it will be understood that there may be any number of software applications 124, 126, 128, 130. Further, two or more of the various applications 124, 126, 128, 130 may be integrated as an integral application, if desired.

It should be appreciated that although the server 108 is illustrated as a single device in FIG. 1A, one or more portions of the server 108 may be implemented as one or more storage devices that are physically co-located with the server 108, or as one or more storage devices utilizing different storage locations as a shared database structure (e.g. cloud storage). In some embodiments, the server 108 may be configured to perform any suitable portion of the processing functions remotely that have been outsourced by the on-board computers and/or mobile devices 102A, 102B, 102C.

Figure 1B:
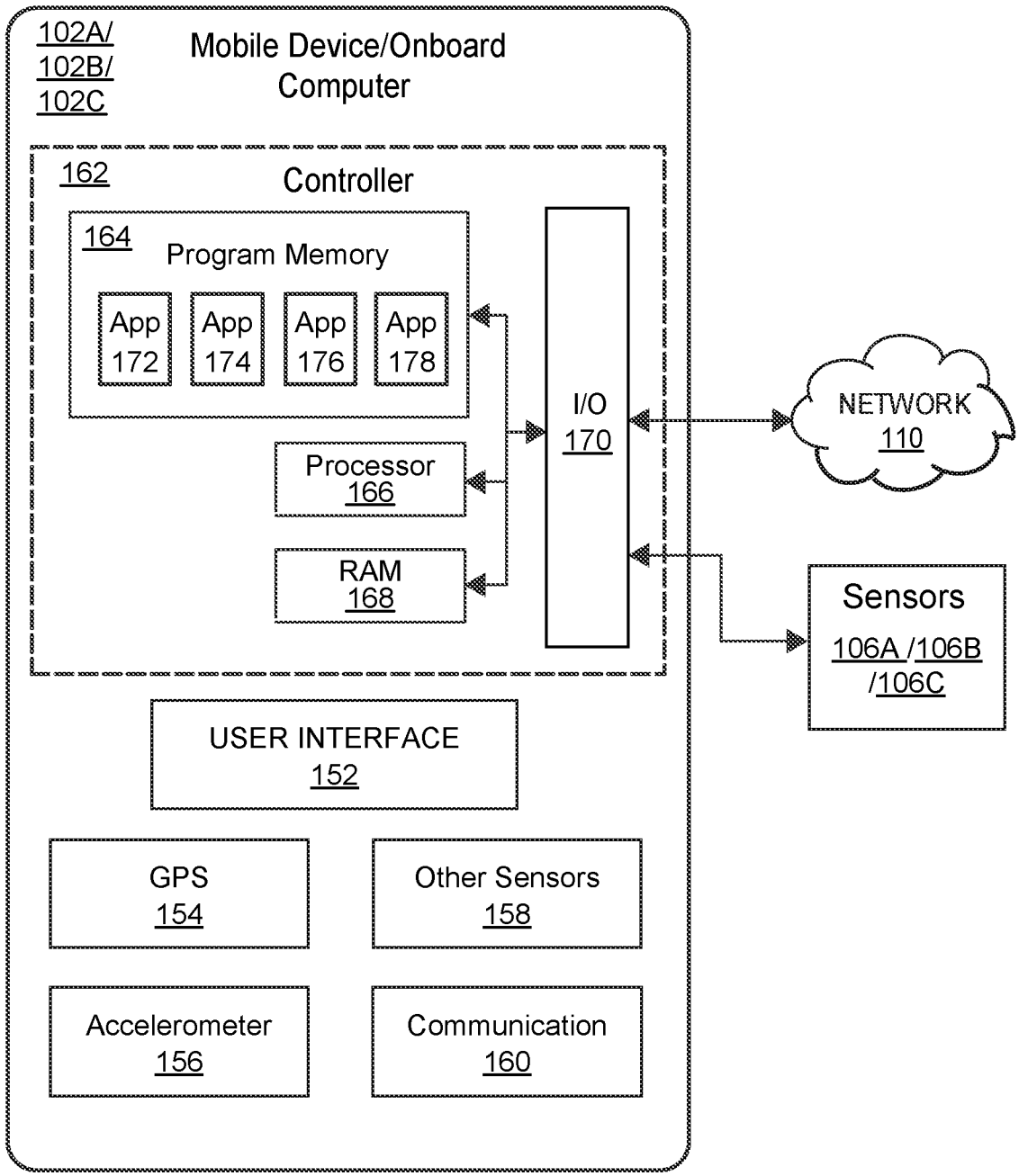
FIG. 1B illustrates an exemplary mobile device and/or onboard computer operable within the system of FIG. 1A, in accordance with some embodiments.

Referring now to FIG. 1B, an exemplary mobile device and/or onboard computer 102A, 102B, 102C associated with a respective vehicles 104A, 104B, 104C is illustrated in greater detail, in accordance with some embodiments. The mobile device and/or onboard computer 102A, 102B, 102C may include one or more of a user interface 152, a GPS unit 154, an accelerometer 156, one or more other sensors 158, a communication unit 160, and/or a controller 162.

Figure 2C:
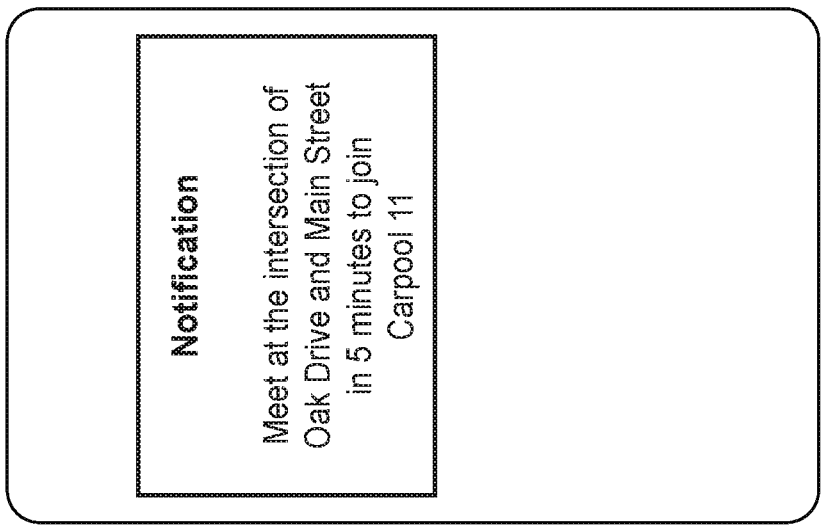
FIGS. 2A-2C illustrate several exemplary user interface displays, in accordance with some embodiments.
Figure 2B:
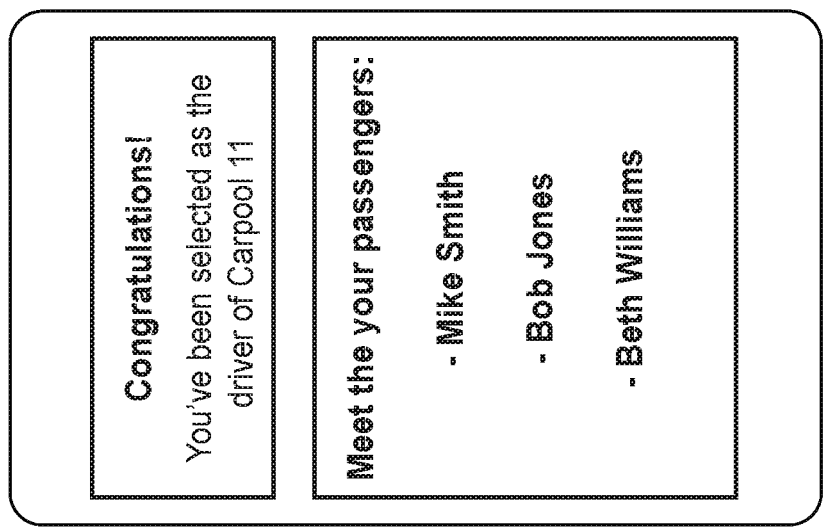
Figure 2A:
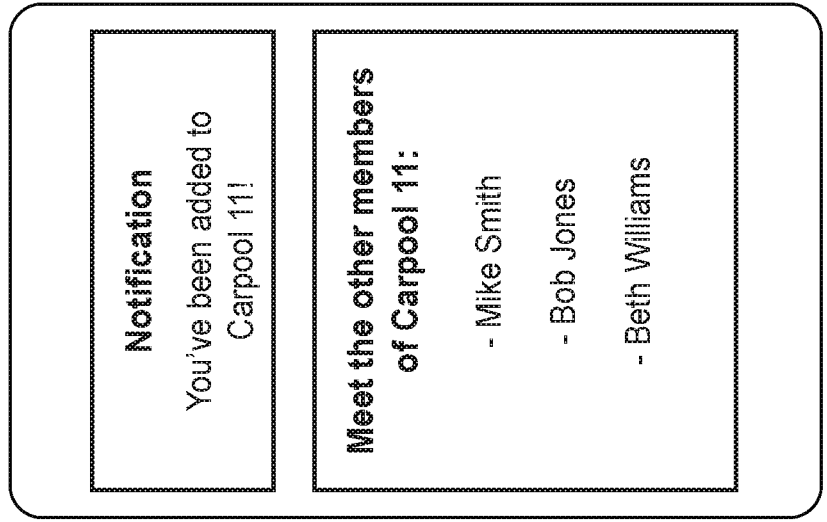

The user interface 152 may be disposed at the mobile device and/or onboard computer 102A, 102B, 102C and may display or present information to vehicle operators and/or passengers. For instance, the information may include, e.g., an indication of a carpooling group into which the vehicle operator has been classified (e.g., as shown in FIG. 2A), an indication that the vehicle operator is to be a driver in a carpool (e.g., as shown in FIG. 2B), an indication that the vehicle operator is to be a passenger in a carpool, an indication of a meeting point for a carpool (e.g., as shown in FIG. 2C), etc. In some instances, the user interface 152 may receive information from vehicle operators and/or passengers. For instance, the information may include, e.g., the make and/or model of the vehicle, an indication of an origin and/or destination of the vehicle operator, etc.

The GPS unit 154 may be disposed at the mobile device and/or onboard computer 102A, 102B, 102C and may collect data indicating the location of the mobile device and/or onboard computer 102A, 102B, 102C, and/or (e.g., by proxy) the respective vehicle 104A, 104B, 104C. Moreover, in some embodiments the GPS unit 140 may be a separate device disposed within or external to the respective vehicle 104A, 104B, 104C (e.g., one of the sensors 106A, 106B, 106C), and interfacing with the mobile device and/or onboard computer 102A, 102B, 102C. The accelerometer 156 may be disposed at the mobile device and/or onboard computer 102A, 102B, 102C and may collect data indicating the acceleration of the mobile device and/or onboard computer 102A, 102B, 102C and/or (e.g., by proxy) the respective vehicle 104A, 104B, 104C. Moreover, in some embodiments the accelerometer 156 may be a separate device disposed within or external to the vehicle 104A, 104B, 104C (e.g., one of the sensors 106A, 106B, 106C), and interfacing with the mobile device and/or onboard computer 102A, 102B, 102C. In general, the GPS unit 154, an accelerometer 156, one or more other sensors 158, and the sensors 106A, 106B, 106C may be configured to capture vehicle sensor data associated with the vehicle 104A, 104B, 104C, e.g., one or more of speed data, acceleration data, braking data, cornering data, following distance data, turn signal data, seatbelt use data, location data, date/time data, or any other suitable vehicle sensor data. The communication unit 160 may be disposed at the mobile device and/or onboard computer 102A, 102B, 102C and may, e.g., transmit and receive information from external sources such as, e.g., the server 108, e.g., via the network 110.

As shown in FIG. 1B, the mobile device and/or onboard computer 102A, 102B, 102C may include a controller 162, which may include one or more program memories 164, one or more processors 166 (which may be, e.g., microcontrollers and/or microprocessors), one or more random-access memories (RAMs) 168, and an input/output (I/O) circuit 170, all of which may be interconnected via an address/data bus. Although the I/O circuit 170 is shown as a single block, it should be appreciated that the I/O circuit 170 may include a number of different types of I/O circuits. The program memory 164 and RAM 168 may be implemented as semiconductor memories, magnetically readable memories, optically readable memories, or biologically readable memories, for example. Generally speaking, the program memory 164 and/or the RAM 168 may respectively include one or more non-transitory, computer-readable storage media. The controller 162 may also be operatively connected to the network 110 via a link.

The mobile device and/or onboard computer 102A, 102B, 102C may further include a number of various software applications 172, 174, 176, 178 stored in the program memory 164. Generally speaking, the applications may perform one or more functions related to, inter alia, capturing vehicle sensor data associated with vehicle operators, transmitting the vehicle sensor data to the server 108, receiving information from the server 108, presenting and/or displaying information from the server 108 to vehicle operators, receiving information from vehicle operators, transmitting the information from the vehicle operators to the server 108, etc. In some instances, one or more of the applications 172, 174, 176, 178 may perform at least a portion of any of the method 300 shown in FIG. 3. The various software applications 172, 174, 176, 178 may be executed on the same processor 166 or on different processors. Although four software applications 172, 174, 176, 178 are shown in FIG. 1B, it will be understood that there may be any number of software applications 172, 174, 176, 178. Further, two or more of the various applications 172, 174, 176, 178 may be integrated as an integral application, if desired. Additionally, it should be appreciated that in some embodiments, the mobile device and/or onboard computer 102A, 102B, 102C may be configured to perform any suitable portion of the processing functions described as being performed by the server 108.

Turning now to FIGS. 2A, 2B, and 2C, several exemplary user interface displays are illustrated, in accordance with some embodiments. As shown in FIG. 2A, a vehicle operator may be notified and/or updated of a carpooling group into which the vehicle operator has been classified, via a mobile device notification displayed on a user interface. For instance, the notification and/or update may include an indication of other vehicle operators who are classified into the same carpooling group. As shown in FIG. 2B, a vehicle operator may be notified and/or updated that he or she has been selected as a driver of a carpool, via a mobile device notification displayed on a user interface. For example, in some instances, the notification may further include an indication of vehicle operators who will be passengers in the carpool. As shown in FIG. 2C, a vehicle operator may be notified of a meeting point for a carpool, via a mobile device notification displayed on a user interface. For example, the meeting point may be a set of cross streets near the origins of vehicle routes associated with the vehicle operators in a carpooling group. The notification of the meeting point may include a notification of a departure time.

Figure 3:
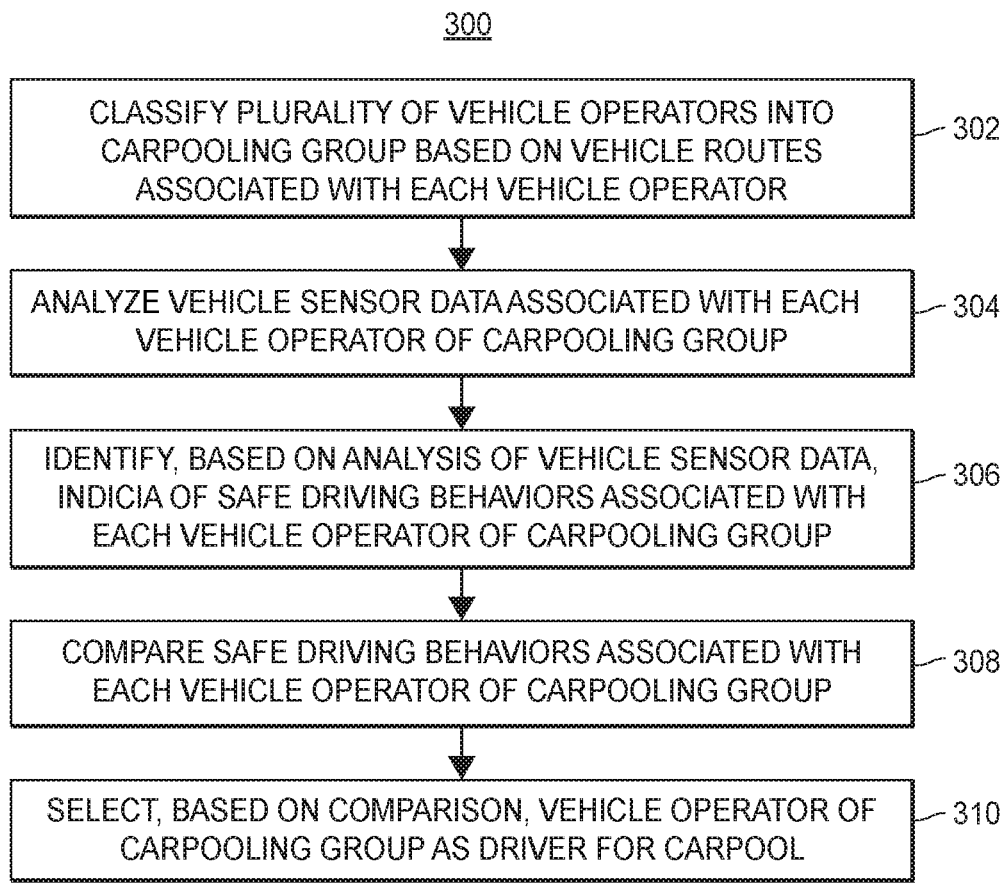
FIG. 3 illustrates a flow diagram of an exemplary computer-implemented method of efficient carpooling based on driver risk groups, in accordance with some embodiments.

Turning now to FIG. 3, a flow diagram of an exemplary computer-implemented method 300 of efficient carpooling based on driver risk groups is illustrated, in accordance with some embodiments. The method 300 can be implemented as a set of instructions stored on a computer-readable memory and executable on one or more processors.

A plurality of vehicle operators may be classified (block 302) into a carpooling group based on vehicle routes associated with each of the vehicle operators. For example, vehicle operators may be classified into a carpooling group based on their past vehicle routes. In some examples, past vehicle routes may be determined based on vehicle telematics data associated with each vehicle operator and/or each vehicle. For instance, vehicle routes may be determined based on an analysis of GPS or other location data detected by sensors associated with a vehicle and/or a vehicle operator. As another example, vehicle operators may be classified into a carpooling group based on upcoming vehicle routes associated with each of the vehicle operators. For example, upcoming vehicle routes may be determined based on origin and/or destination information provided by a vehicle operator, e.g., in a mapping application of a computing device associated with a vehicle and/or a vehicle operator.

A vehicle operator may be classified into a carpooling group with other vehicle operators whose vehicle routes include common origins and/or common destinations. For example, several vehicle operators who have each previously driven to 100 N Main Street may be classified into the same carpooling group. As another example, several vehicle operators who have each previously driven from 500 State Street to 100 N Main Street may be classified into the same carpooling group. In some examples, common origins and/or common destinations may include proximate origins and/or proximate destinations (e.g., origins within 1000 feet of one another, destinations within 500 feet of one another, etc.). For instance, several vehicle operators may be classified into the same carpooling group based on vehicle routes originating from different houses in the same neighborhood.

Furthermore, vehicle operators may be classified into a carpooling group based on arrival and/or departure times associated with the vehicle routes. For example, vehicle operators who typically arrive at 100 N Main Street at 8 am may be classified into one carpooling group, while vehicle operators who typically arrive at 100 N Main Street at 10 am may be classified into another carpooling group. Additionally, vehicle operators may be classified into a carpooling group based on the frequency with which each vehicle operator drives each route. Several vehicle operators who go to and/or from the similar locations at similar times may be classified into a carpooling group.

In some embodiments, vehicle routes may be inferred for vehicle operators based on characteristics of the vehicle operators, such as, e.g., affiliation with an organization that meets regularly. For example, a vehicle operator's affiliation with a particular organization may imply that the vehicle operator may frequently take vehicle trips to the same destination at similar times. For instance, employees of the same company, students at the same school, volunteers at the same organization, members of the same church, etc., may take vehicle trips to the same location at similar times each day (or each week). Accordingly, it may be efficient for members of each organization to join carpool groups together.

Vehicle sensor data associated with each vehicle operator of the carpooling group may be analyzed (block 304). The vehicle sensor data associated with each vehicle operator may include, for instance, speed data, acceleration data, braking data, cornering data, following distance data, turn signal data, seatbelt use data, location data, date/time data, or any other suitable vehicle sensor data. This vehicle sensor data may be analyzed to determine instances in which the vehicle operators exhibit safe driving behaviors (as opposed to unsafe driving behaviors), and these instances of safe driving behavior may be recorded.

For instance, vehicle sensor data indicating that the speed of the vehicle is above a certain threshold speed may indicate an unsafe driving behavior, while vehicle sensor data indicating that the speed of the vehicle is below that speed may indicate a safe driving behavior. Similarly, for example, acceleration at a rate above a certain threshold rate may indicate an unsafe driving behavior, while acceleration below that threshold rate may indicate a safe driving behavior. As another example, braking data may be analyzed to determine instances of "hard" versus "soft" braking, with hard braking indicating an unsafe driving behavior while soft braking indicates a safe driving behavior.

In some instances, multiple types of vehicle sensor data may be combined to determine indications of safe and unsafe driving behavior. For example, location data may be combined with speed data to determine whether a vehicle operator is exceeding local speed limits (an unsafe driving behavior) or following them (a safe driving behavior). As another example, seatbelt use data may be combined with speed data to determine whether the vehicle operator is using a seatbelt while the vehicle is in motion (a safe driving behavior).

Based on the analysis of the vehicle sensor data, one or more indicia of safe driving behavior associated with each vehicle operator of the carpooling group may be identified (block 306). In some examples, an indication of the safe driving behavior associated with a vehicle operator may be a score or rating associated with the vehicle operator (e.g., a score of 70 out of 100, A+, four out of five stars, etc.) In some examples, the score or rating may be calculated based on, e.g., frequency and/or consistency of the safe driving behaviors, a "streak" of safe driving behavior, etc. As another example, calculating this score or rating may include weighting various types of safe driving behavior differently, weighting safe and unsafe driving behaviors differently, etc.

The safe driving behaviors associated with each vehicle operator of the carpooling group may be compared (block 308). For example, scores or ratings indicating safe driving behavior associated with each vehicle operator of the carpooling group may be compared. In some examples, the safety of the vehicles associated with each vehicle operator of the carpooling group may also be compared. Based on the comparison, a vehicle operator of the carpooling group may be selected (block 310) as the driver of a carpool. The carpool may include one or more of the other vehicle operators of the carpooling group as passengers. For example, based on the comparison, one vehicle operator of the carpooling group may be identified as the safest driver of the carpooling group, and this safest driver may be selected as the driver of the carpool. Accordingly, the other vehicle operators of the carpool group may be passengers of the carpool.

In some examples, the driver of the carpool may be selected based on some combination of the safety of each vehicle operator in the carpooling group and the safety of each vehicle in the carpooling group. For example, the safe driving behaviors of each vehicle operator may be weighted with the safety of the vehicle associated with each vehicle operator to determine an overall safety score of each vehicle operator. The vehicle operator with the highest overall safety score may be identified as the safest driver of the carpooling group, and may be selected as the driver of the carpool, while the other vehicle operators may be passengers of the carpool. Moreover, in some examples, the safest driver of the carpooling group and the safest vehicle of the carpooling group may be identified separately. In some instances, the safest driver may not be associated with the safest vehicle. In one example, the safest vehicle in the carpool may be identified as the driving vehicle even if it is associated with a passenger. Accordingly, in such an example, the safest driver may be instructed to drive the safest vehicle.

The method 300 may additionally include, e.g., notifying members of a carpooling group of a name and/or number of the carpooling group. Moreover, the method 300 may include providing a list of members of the carpooling group to each member of the carpooling group. The list of members of the carpooling group may include contact information for each member of the carpooling group. Furthermore, the method 300 may include notifying the members of the carpooling group of the driver and/or driving vehicle selected for the carpooling group.

In some instances, such as each member's origin and/or destination location for an upcoming route are close to one another but not exactly the same, a meeting point for the carpooling group may be selected, and the members of the carpooling group may be provided with instructions for getting to the meeting point. In some instances, vehicle operators may be provided with scooters or other alternative forms of transportation for transit to and from the meeting point. These scooters or other alternative forms of transportation may be small enough for storage in the driving vehicle (e.g., in the trunk). In some instances, the scooters or other alternative forms of transportation may be configured to be folded or otherwise compressed for storage in the driving vehicle.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In some example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of efficient carpooling based on driver risk groups, the method comprising:
   classifying a plurality of vehicle operators into a carpooling group based on vehicle routes associated with each of the vehicle operators;
   analyzing vehicle sensor data associated with each vehicle operator of the carpooling group, the vehicle sensor data indicative at least one of speed data, acceleration data, braking data, cornering data, following distance data, turn signal data, and seatbelt use data;
   identifying based on the analysis of the vehicle sensor data, one or more indicia of safe driving behaviors associated with each vehicle operator of the carpooling group;
   comparing the safe driving behaviors associated with each vehicle operator of the carpooling group; and
   selecting based on the comparison, a vehicle operator of the carpooling group as a driver for a carpool, the carpool including one or more of the other vehicle operators of the carpool group as passengers.

2. The computer-implemented method of claim 1, wherein classifying the plurality of vehicle operators into a carpooling group based on vehicle routes associated with each of the vehicle operators comprises:
   classifying the plurality of vehicle operators into a carpooling group based on one or more past vehicle routes associated with each of the vehicle operators.

3. The computer-implemented method of claim 1, wherein classifying the plurality of vehicle operators into a carpooling group based on vehicle routes associated with each of the vehicle operators comprises:
   classifying the plurality of vehicle operators into a carpooling group based on one or more upcoming vehicle routes associated with each of the vehicle operators.

4. The computer-implemented method of claim 1, wherein classifying the plurality of vehicle operators into a carpooling group based on vehicle routes associated with each of the vehicle operators comprises:
   classifying the plurality of vehicle operators into a carpooling group based on a common origin and/or common destination of the vehicle routes associated with each of the vehicle operators.

5. The computer-implemented method of claim 1, wherein selecting a vehicle operator of the carpooling group as a driver for a carpool comprises:
   identifying based on the safe driving behaviors associated with each vehicle operator of the carpooling group, a safest vehicle operator of the carpooling group; and
   selecting the safest vehicle operator of the carpooling group as the driver for the carpool.

6. The computer-implemented method of claim 5, wherein selecting a vehicle operator of the carpooling group as a driver for a carpool comprises:
   comparing vehicles associated with each vehicle operator of the carpooling group;
   identifying a safest vehicle of the vehicles associated with each vehicle operator of the carpooling group; and
   selecting the identified safest vehicle as the driving vehicle for the carpool, wherein the driving vehicle is to be operated by the driver for the carpool.

7. The computer-implemented method of claim 6, wherein the driving vehicle is a vehicle associated with one of the passengers of the carpool.

8. The computer-implemented method of claim 1, wherein selecting a vehicle operator of the carpooling group as a driver for a carpool comprises:
   comparing the safety of vehicles associated with each vehicle operator of the carpooling group; and
   selecting based on both the safe driving behaviors associated with each vehicle operator of the carpooling group and the safety of the vehicles associated with each vehicle operator of the carpooling group, a vehicle operator as the driver for the carpool.

9. A computer system for efficient carpooling based on driver risk groups, the computer system comprising:
   one or more processors; and
   one or more non-transitory memories storing instructions that, when executed by the one or more processors, cause the computer system to:
   classify a plurality of vehicle operators into a carpooling group based on vehicle routes associated with each of the vehicle operators;
   analyze vehicle sensor data associated with each of the plurality of vehicle operators of the carpooling group, the vehicle sensor data indicative at least one of speed data, acceleration data, braking data, cornering data, following distance data, turn signal data, and seatbelt use data;

identify, based on the analysis of the vehicle sensor data, one or more indicia of safe driving behaviors associated with each vehicle operator of the carpooling group;

compare the safe driving behaviors associated with each vehicle operator of the carpooling group; and select, based on the comparison, a vehicle operator of the carpooling group as a driver for a carpool, the carpool including one or more of the other vehicle operators of the carpool group as passengers.

10. The computer system of claim 9, wherein the instructions cause the computer system to classify the plurality of vehicle operators into a carpooling group based on vehicle routes associated with each of the vehicle operators by:

classifying the plurality of vehicle operators into a carpooling group based on one or more past vehicle routes associated with each of the vehicle operators.

11. The computer system of claim 9, wherein the instructions cause the computer system to classify the plurality of vehicle operators into a carpooling group based on vehicle routes associated with each of the vehicle operators by:

classifying the plurality of vehicle operators into a carpooling group based on one or more upcoming vehicle routes associated with each of the vehicle operators.

12. The computer system of claim 9, wherein the instructions cause the computer system to classify the plurality of vehicle operators into a carpooling group based on vehicle routes associated with each of the vehicle operators by:

classifying the plurality of vehicle operators into a carpooling group based on a common origin and/or common destination of the vehicle routes associated with each of the vehicle operators.

13. The computer system of claim 9, wherein the instructions cause the computer system to select a vehicle operator of the carpooling group as a driver for a carpool by:

identifying, based on the safe driving behaviors associated with each vehicle operator of the carpooling group, a safest vehicle operator of the carpooling group; and selecting the safest vehicle operator of the carpooling group as the driver for the carpool.

14. The computer system of claim 13, wherein the instructions further cause the computer system to:

compare vehicles associated with each vehicle operator of the carpooling group;

identify a safest vehicle of the vehicles associated with each vehicle operator of the carpooling group; and select the identified safest vehicle as the driving vehicle for the carpool, wherein the driving vehicle is to be operated by the driver for the carpool.

15. The computer system of claim 14, wherein the driving vehicle is a vehicle associated with one of the passengers of the carpool.

16. The computer system of claim 9, wherein the instructions cause the computer system to select a vehicle operator of the carpooling group as a driver for a carpool by:

comparing the safety of vehicles associated with each vehicle operator of the carpooling group; and selecting, based on both the safe driving behaviors associated with each vehicle operator of the carpooling group and the safety of the vehicles associated with each vehicle operator of the carpooling group, a vehicle operator as the driver for the carpool.

17. A non-transitory computer-readable storage medium having stored thereon a set of instructions for efficient carpooling based on driver risk groups, executable by a processor, the instructions comprising instructions for:

classifying a plurality of vehicle operators into a carpooling group based on vehicle routes associated with each of the vehicle operators;

analyzing vehicle sensor data associated with each of the plurality of vehicle operators of the carpooling group, the vehicle sensor data indicative at least one of speed data, acceleration data, braking data, cornering data, following distance data, turn signal data, and seatbelt use data;

identifying, based on the analysis of the vehicle sensor data, one or more indicia of safe driving behaviors associated with each vehicle operator of the carpooling group;

comparing the safe driving behaviors associated with each vehicle operator of the carpooling group; and selecting, based on the comparison, a vehicle operator of the carpooling group as a driver for a carpool, the carpool including one or more of the other vehicle operators of the carpool group as passengers.

18. The non-transitory computer-readable storage medium of claim 17, wherein the instructions for selecting a vehicle operator of the carpooling group as a driver for a carpool comprise instructions for:

identifying, based on the safe driving behaviors associated with each vehicle operator of the carpooling group, a safest vehicle operator of the carpooling group; and selecting the safest vehicle operator of the carpooling group as the driver for the carpool.

19. The non-transitory computer-readable storage medium of claim 18, wherein the instructions for selecting a vehicle operator of the carpooling group as a driver for a carpool comprise instructions for:

comparing vehicles associated with each vehicle operator of the carpooling group;

identifying a safest vehicle of the vehicles associated with each vehicle operator of the carpooling group; and selecting the identified safest vehicle as the driving vehicle for the carpool, wherein the driving vehicle is to be operated by the driver for the carpool.

20. The non-transitory computer-readable storage medium of claim 19, wherein the driving vehicle is a vehicle associated with one of the passengers of the carpool.

* * * * *